United States

Kaminow et al.

[15] 3,675,157
[45] July 4, 1972

[54] TUNABLE LASER IN A SENSITIZED TRANSPARENT MATERIAL INCLUDING AN INTERNAL RESONATOR AND OPTICAL GUIDE

[72] Inventors: Ivan Paul Kaminow, New Shrewsbury; Heinz Paul Weber, Middletown, both of N.J.

[73] Assignee: Bell Telephone Laboratories, Incorporated, Murray Hill, Berkeley Heights, N.J.

[22] Filed: April 27, 1971

[21] Appl. No.: 137,866

[52] U.S. Cl..............................................331/94.5, 350/160
[51] Int. Cl............................................................H01s 3/16
[58] Field of Search....................331/94.5; 350/160; 330/4.3

[56] References Cited

UNITED STATES PATENTS 3,372,972  3/1968  Schmidt et al..........................350/160

OTHER PUBLICATIONS

Soffer et al., Continuously Tunable Narrow–Band Organic Dye Lasers. Appl. Phys. Let., Vol. 10, (May 15, 1967) pp. 266–267.

Peterson et al., Stimulated Emission from Flashlamp–Excited Organic Dyes in Polymethyl Methacrylate. Appl. Phys. Let. Vol. 12, No. 7, (April 1, 1968) pp. 238–240.

Tomlinson et al., Photoinduced Refractive Index in Poly(Methylmethacrylate) and its Applications. Appl. Phys Let. Vol. 16, No. 12 (June 15, 1970) pp. 486–489.

*Primary Examiner*—William L. Sikes
*Attorney*—R. J. Guenther and Arthur J. Torsiglieri

[57] ABSTRACT

There is disclosed a compact, narrow-band single frequency laser employing a pair of internal grating reflectors photo-induced in a suitably sensitized transparent material doped with an active medium. Specifically, a laser is obtained in a photosensitized sample of dye-doped poly(methyl methacrylate). It includes an internal resonator formed by a pair of grating reflectors permanently induced in the sample, in which optical guides can also be induced upon exposure to ultraviolet radiation. The resonated laser frequency is selected from the usual broad dye emission spectrum by choice of the grating spacings. Tunability can be achieved by applying stress to the sample to change the grating spacings and the laser resonator length either simultaneously or independently.

12 Claims, 5 Drawing Figures

INVENTORS I. P. KAMINOW
H. P. WEBER
BY Wilford L. Wisner
ATTORNEY

TUNABLE LASER IN A SENSITIZED TRANSPARENT MATERIAL INCLUDING AN INTERNAL RESONATOR AND OPTICAL GUIDE

BACKGROUND OF THE INVENTION

This invention relates to lasers and, more particularly, to dye lasers including internal resonators and optical guides.

In general, lasers consist of active media which produce gain when excited, and resonator structures which provide feedback for the stimulated emission of the radiation. The active media may be any of a number of types of forms. While research in the laser art has produced numerous proposals for laser media, the problems encountered in the development and use of the media in operating systems have also been numerous. For example, lasers using solid state active media are often quite difficult to fabricate to the degree of precision required for stable operation, and hence are quite expensive. Lasers employing liquid or gaseous active media can require relatively large, complex and delicate arrangements for containing, exciting, or flowing the media during operation. Moreover, the laser media are usually to some extent sensitive to operating conditions such as temperature.

The most common laser resonator structure is, perhaps, a pair of mirrors or diffraction gratings, one at each end of the active region of the laser, which reflect the radiation back and forth through the active media. In most cases, the alignment of the reflectors and their spacing is critical. The problems of maintaining alignment and spacing under operating conditions can give rise to complex and expensive arrangements.

SUMMARY OF THE INVENTION

We have discovered a way to employ waveguide effects to alleviate these problems.

In the copending application of E. A. Chandross, R. L. Fork, I. P. Kaminow and W. J. Tomlinson III, Ser. No. 21,102, filed Mar. 19, 1970, and assigned to the assignee hereof, it was shown that permanent regions of elevated refractive index could be photo-induced in properly prepared transparent materials such as poly(methyl methacrylate) to produce high quality, three-dimensional grating reflectors and optical guides.

We have found that regions of elevated index of refraction can be produced in sensitized transparent materials doped with a sufficient concentration of active medium to be suitable for lasers. Using a pair of grating reflectors photo-induced inside a sample of the material, we have produced a simply and inexpensively constructed, compact and rugged, narrow-band, single frequency laser.

Specifically, a laser according to our invention, is obtained in a cigarette-size sensitized sample of dye-doped poly(methyl methacrylate). It includes an internal resonator formed by a pair of aligned grating reflectors permanently induced in the sample upon exposure to ultraviolet radiation. The grating spacing $d$ between planes of equivalent index is chosen to reflect, and hence resonate, a selected wavelength $\lambda_0$ in the usually broad dye emission spectrum.

In this arrangement, the laser can be efficiently pumped either axially through the aligned reflectors by a second laser, or transversely in the region between the reflectors by a simple flash lamp. In either case, a narrow (~0.1 Angstroms) optical line at $\lambda_0$ equal to approximately 5,700 Angstroms can be obtained.

One feature of the above-described laser is that the output wavelength $\lambda_0$ is relatively insensitive to temperature change. This feature, combined with the compact size and the internal resonator which is permanently aligned, make a laser according to our invention particularly attractive as a rugged, easy to handle, fixed frequency source useful under various operating conditions.

In one embodiment of our invention, an internal axial optical guide is combined with the internal grating reflectors to produce a guided laser source suitable for an integrated optics arrangement. The guide typically confines both the pumping radiation and the selected wavelength radiation to a small region in the laser sample providing relatively low thresholds and high efficiencies for the laser.

Tunability is achieved in another embodiment of the invention by applying stress to a laser sample to change the grating spacing $d$ of the reflectors and hence to tune the resonated wavelength $\lambda_0$. Stress may also be employed to tune the laser resonator length.

As an inexpensive, highly monochromatic, tunable optical source, a laser according to our invention should be useful in many diverse fields and applications. The laser, for example, could readily be used in systems for testing gases, such as air or automobile exhaust, for specific pollutants on a routine basis. Moreover, hundreds of the laser samples with various grating spacings and hence various output wavelengths could be simple and cheaply manufactured and used to replace existing samples in operating systems as they become depleted or when a change in output wavelength is desirable.

BRIEF DESCRIPTION OF THE DRAWING

A more complete understanding of the foregoing and other features and advantages according to our invention can be obtained from the following detailed description with reference to the accompanying drawings in which.

DESCRIPTION OF THE ILLUSTRATIVE EMBODIMENTS

Figure 1:
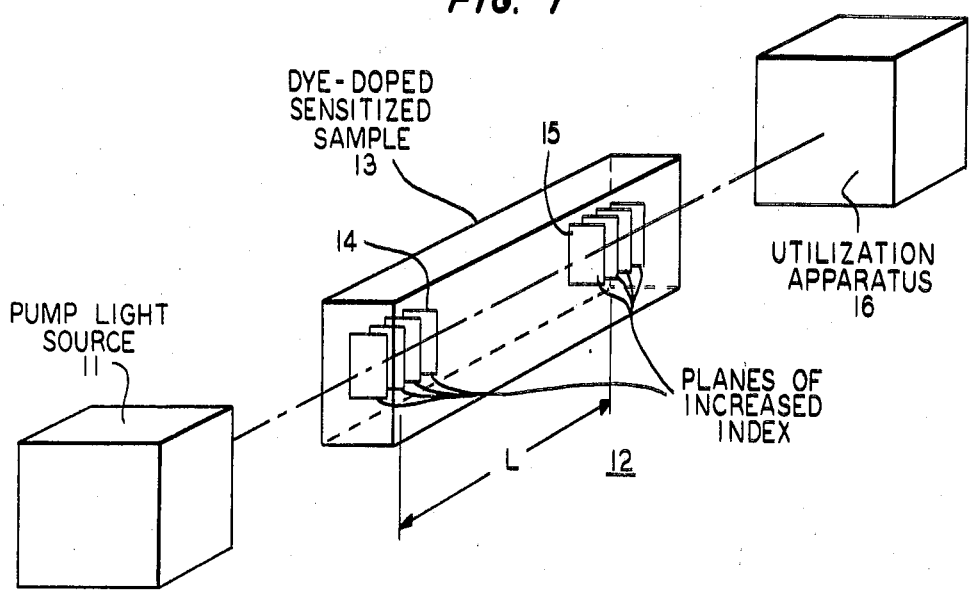
FIG. 1 is a partially pictorial, partially diagrammatic illustration of a laser apparatus according to our invention including a laser sample with internal grating reflectors.

In FIG. 1, source 11 supplies pumping radiation to excite laser 12 including a sample 13 of optically transparent material suitably sensitized for photo-induced irreversible molecular structural change tending to increase the refractive index thereof and doped with an active medium providing substantial gain in a particular wavelength range. Internal grating reflector 14 is made reflective of radiation at a selected wavelength in the gain range of the active medium and transmissive of the pumping radiation. Grating reflector 15 is partially reflective at the selected wavelength and partially transmissive. Together reflectors 14 and 15 bidirectionally reflect the selected wavelength radiation and thereby form a resonator internal to sample 13 suitable for stimulating coherent emission of the radiation, a portion of which is extracted for utilization in apparatus 16.

Sample 13 is illustratively composed of poly(methyl methacrylate) sensitized for refractive index increases upon exposure to ultraviolet radiation and doped with an active dye medium. The sample is typically prepared by first dissolving the dye of appropriate concentration in the monomer methyl methacrylate which includes sensitizing ingredients such as peroxides. The monomer is devoid of any additives to stabilize the poly(methyl methacrylate) against ultraviolet damage. The solution is then polymerized at low temperatures around 40 to 50° centigrade so as not to impair the sensitivity provided by the peroxides.

The method of obtaining the sensitized materials, excluding the active medium, is explained in considerable detail in the above-mentioned copending application of E. A. Chandross et al. We have applied that method to materials doped with a sufficient concentration of active medium to be suitable for lasers according to our invention.

Figure 2:
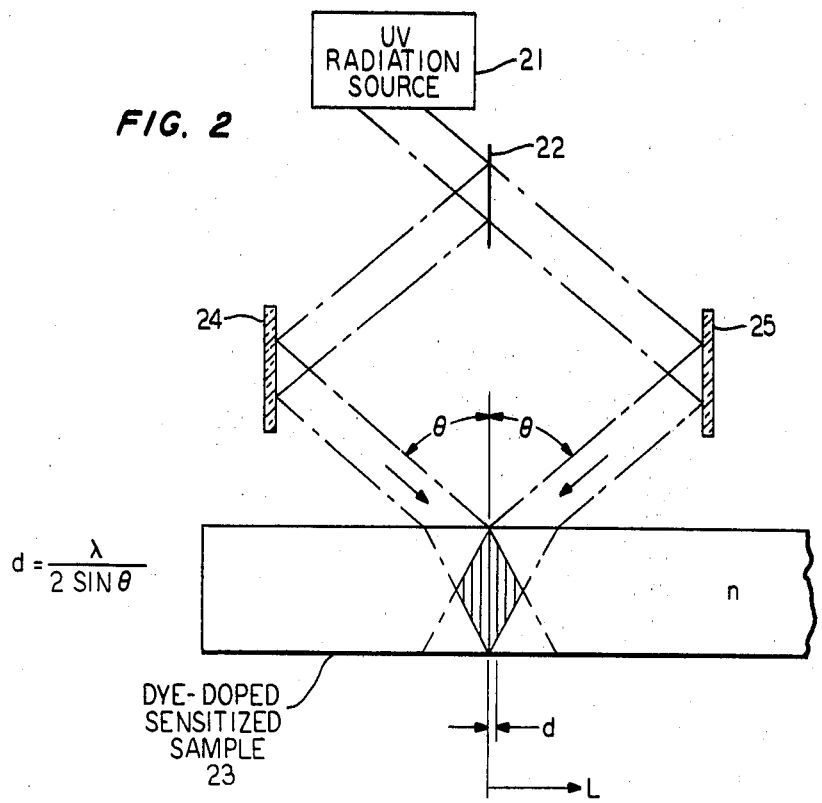
FIG. 2 is a partially pictorial, partially diagrammatic illustration of apparatus for exposing a laser sample according to our invention to make a grating reflector.

Grating reflectors 14 and 15 are produced in a suitably sized sample of the dye-doped photosensitized material by creating a series of partially reflecting parallel planes of alternating high and low refractive index with spacing $d$ between equivalent planes to reinforce reflections at the selected wavelength. The reflectors are analogous to layered dielectric mirrors and should be large enough in the transverse plane to intercept most of the radiation emitted in the sample. The means for accomplishing the required index change in poly(methyl methacrylate) is also described in the above-mentioned copending application. Two ultraviolet beams, which are derived from the same source 21 by beam splitter 22 and reflected by mirrors 24 and 25, intersect at an angle $2\theta$ and are incident on a broad surface of sample 23 as shown in FIG. 2. The interplanar spacing is governed by the Bragg formula:

$$d = \lambda/2 \sin \theta \qquad (1)$$

where $\lambda$ is the wavelength of the irradiating beams from source 21 measured outside sample 23, and $\theta$ is also measured outside sample 23 from a perpendicular to the surface thereof. Source 21 is illustratively a helium-cadmium laser supplying radiation beams at $\lambda = 3,250$ A in the ultraviolet.

The angle $\theta$ is chosen to form a reflecting grating for normal incidence of a beam of radiation at the selected laser output wavelength $\lambda_0$ given by the equation $$\lambda_0 = 2nd \qquad (2)$$

where $\lambda_0$ is measured outside sample 23, $n$ is the refractive index of the sample 23, and $d$ is the grating spacing. After exposing the first grating reflector, the sample 23 is translated in a straight line by a distance $L$, the desired laser resonator length, and the second grating reflector is exposed. Alternatively, both gratings could be produced simultaneously by suitably masking a broad pair of intersecting ultraviolet beams. Reflectors 14 and 15 need not be identical in reflectivity and bandwidth.

While the exposure of the sample to the ultraviolet radiation is effective to induce the index change, the amount and gradient of the index change may be subsequently substantially increased by aging. Preferably, the samples are set aside until a stable condition is achieved before testing as a laser. Good results are obtained by leaving the exposed samples in a dark place at a temperature below about 60° centigrade for a period of several days. The aging has no noticeable effect on the concentration of the active medium.

Suitable starting materials for the laser sample 13 of FIG. 1 should include a large number of solids which are useful for optical transmission and susceptible to molecular structural change in index of refraction. All of the materials suitable for the above-mentioned copending application should be suitable for our invention provided they can be properly doped with the active medium without substantially affecting their photosensitivity. We suggest plastics such as poly(methyl methacrylate) because of their several useful properties, some of which are described hereinbelow. In some substances, radiation at wavelengths outside the ultraviolet band may also be able to induce the index change.

Numerous active media may be suitable as gain media for the laser according to our invention. The active media preferably provide substantial gain in a relatively broad output spectrum (~100Å or more) and undergo little damage upon exposure to the radiation used to effect the index change in the sample, i.e., ultraviolet radiation. Organic dyes suitable for our invention include Rhodamine 6G, Rhodamine B, and other xanthene dyes, or coumarin, carbocyanine and rare earth chelate dyes.

Sample 13, when finally prepared and ready for use as a laser, may be excited by passing the pumping beam from source 11 through the aligned grating reflectors 14 and 15 as shown in FIG. 1 or, in the alternative, by a flash lamp disposed parallel and coupled to the sample by a suitable light pipe or reflector arrangement. The latter excitation means is especially useful in systems requiring a rugged, inexpensive, easy-to-handle optical source.

It is well known that dye molecules are subject to permanent bleaching after being excited a large but finite number of times. In general, the number of output pulses $N_p$ obtainable from a dye-doped sample is given by the equation:

$$N_p = \frac{N_B N_C V}{N_{Ph}} \qquad (3)$$

where $N_B$ is the bleaching number for the active dye molecules, more specifically, the numbers of transitions to the excited state a dye molecule will undergo before permanent bleaching, $N_C$ is the concentration of the dye in the sample in molecules per unit volume, $V$ is the volume of the sample, and $N_{Ph}$ is the number of pump photons per pump pulse absorbed in the volume $V$. Typically, the bleaching number $N_B$ for Rhodamine 6G in a solid poly(methyl methacrylate) matrix is of the order of $10^8$.

Permanent bleaching, therefore, will eventually limit the life of a dye laser. However, the millions of pulses obtainable from a cigarette-size laser sample according to our invention are more than adequate for numerous uses and arrangements of the laser. Furthermore, there is no apparent reason why the bleaching of the dye cannot be eventually overcome or why other active media suitable for our invention with much larger bleaching numbers ($N_B \to \infty$) cannot be found.

In a preliminary experiment, we constructed and operated a laser in photosensitized poly(methyl methacrylate) doped with a Rhodamine 6G dye medium. The laser was pumped by radiation from a frequency-doubled Nd: glass laser source at 5,300 A having a line width of approximately 30 cm$^{-1}$ and a pulse duration $\tau$ of about 20 nanoseconds. The absorption peak of Rhodamine 6G dye in the poly(methyl methacrylate) medium is close to 5,300 A.

A $38 \times 10 \times 4$ cubic millimeter sample of the poly(methyl methacrylate) was prepared as described above with the dye concentration being adjusted to approximately $5 \times 10^{15}$ molecules per cubic centimeter, or $8 \times 10^{-6}$ moles per liter, to give a small signal absorption of about 20 dB per centimeter at the 5,300 A. The absorption by the dye was found to be unchanged after polymerization. It was also found that 95 percent of the pump power was absorbed in the sample with this concentration.

Grating reflectors were produced in the sample by intersecting two ultraviolet beams at 3,250 A as shown in FIG. 2, having beam diameters of about 2 mm, so that the gratings occupied a volume of approximately $2 \times 2 \times 2$ cubic millimeters in the sample. After the first grating was exposed, the poly(methyl methacrylate) sample was translated by a distance $L = 20$ mm and the second grating was exposed. The exposure time for each grating reflector was 2.5 minutes with a power of about 0.7 milliwatts per beam. Upon completion of the exposure, the sample was set aside to age. After the passage of a couple of days, the sample was found to be in a stable condition suitable for testing.

Although the Rhodamine 6G dye medium absorbs weakly at a wavelength of 3,250 A, the dye had a negligible effect on the photodielectric sensitivity at the concentration employed. The index change $\Delta n$ between high and low index planes in the gratings tuned for reflecting a wavelength $\lambda_0 = 5,702$ A was approximately $10^{-4}$. The gratings reflectivity $\eta$ was about 50 percent, and the grating bandwidth $\Delta\lambda_0$ was approximately 0.4 A. This bandwidth would have been decreased by increasing the effective number of reflecting planes in the gratings, i.e., by decreasing $\Delta n$.

Figure 3:
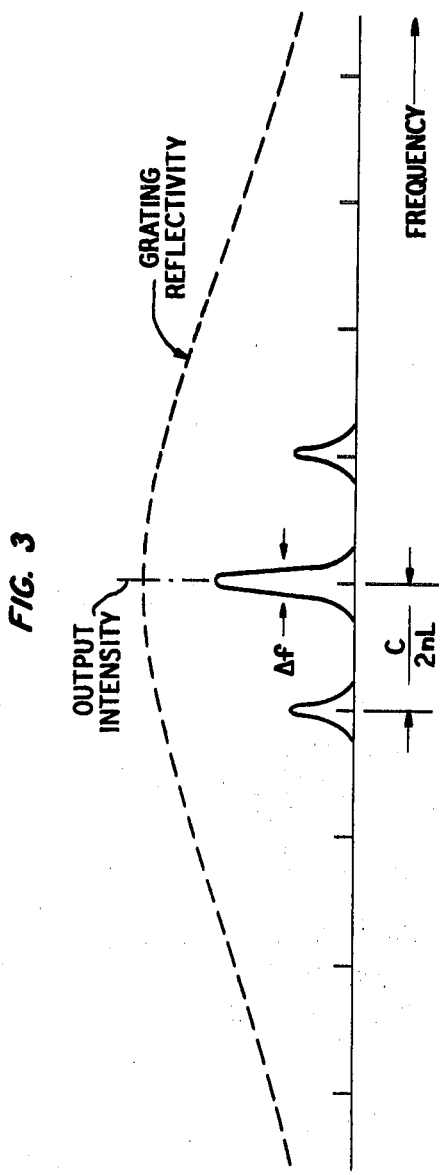
FIG. 3 is a graph of the experimental output results obtained from a laser according to our invention.

The sample was axially pumped by the frequency-doubled Nd: glass laser beam at about six times the threshold power for Rhodamine 6G dye in the poly(methyl methacrylate) matrix by passing the beam through the two grating reflectors tuned for 5,702 A. The output was examined using a Fabry-Perot interferometer having a free spectral range of 27 gigahertz and a resolution of 0.1 gigahertz. The experimental results are illustrated in the graph of FIG. 3.

The output consisting of one strong line at 5,702 A and two weaker ones separated by $c/2nL$ equal to 5 gigahertz (0.05 A)

where $c$ is the speed of light in a vacuum and $n$ and $L$ are defined above. Each line had a line width $\Delta f$ of less than 0.5 gigahertz (0.005 A). The total width of the output radiation (the three lines) was 10 gigahertz (0.11 A) and was limited by the grating reflector bandwidth $\Delta\lambda_0$ equal to 0.4 A (36 gigahertz) as seen in FIG. 3. If pumped close to the threshold level, it was clear that only one mode would oscillate. For single mode operation, it is advantageous to have one relatively narrow-band and one relatively broad-band reflector in order that the mode not be overdetermined, that is, in order that at least the one mode can oscillate.

Only approximately 5 percent of the pump power absorbed (1.3 megawatts) was converted into laser output (~65 kilowatts). The Stokes loss in converting 5,300 Å photons into 5,702 Å photons is only about 8 percent. Much of the remaining loss was due to the small effective grating diameters and the less than optimum grating reflectivity $\eta$. Larger grating diameters and higher reflectivities would readily improve both the threshold and efficiency of the laser considerably.

It is noted that lasers according to our invention can be quite insensitive to temperature and hence relatively stable under less than ideal temperature conditions. Examination of the above-described laser in a varying temperature atmosphere showed a temperature coefficient of output wavelength $d\lambda_0/dT$ of less than $2 \times 10^{-2}$ Å per degree centigrade. This was due to the fact that decreases in $n$ the refractive index of the poly(methyl methacrylate) with temperature are almost exactly compensated by increases in $d$ the grating spacing with temperature. The shift in $\lambda_0$, governed by Equation (2) above, is consequently small.

Figure 4:
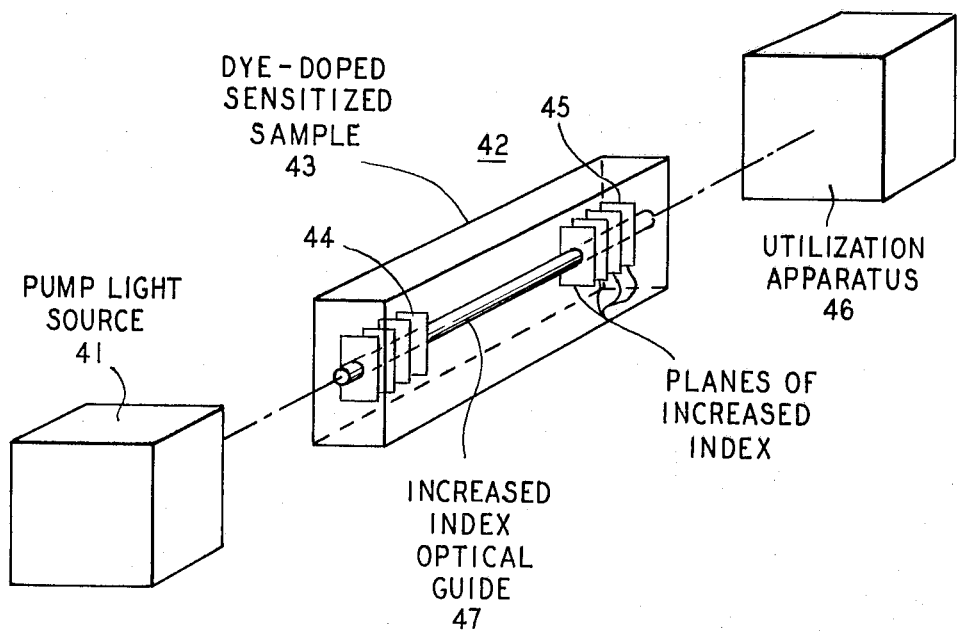
FIG. 4 is a partially pictorial, partially diagrammatic illustration of a laser apparatus according to our invention employing an internal axial optical guide.

A modification of the laser described hereinabove is shown in FIG. 4. Laser 42 combines an internal axial optical guide 47 with grating reflectors 44 and 45, all of which are illustratively induced in the photosensitized poly(methyl methacrylate) sample 43 according to the above-mentioned copending application.

The guide 47 is produced in the sample by sharply focusing a beam of ultraviolet radiation from a suitable source to a small beam waist within the desired region of the sample which is then translated in a straight line transverse to the focused beam. Upon completion of the translation from one lateral surface of sample 43 to the opposite lateral surface, the sample is removed from the focus. Grating reflectors 44 and 45 are then exposed by intersecting two ultraviolet beams and causing them to irradiate the desired reflector regions spaced along the guide. The sample is finally set aside to age.

The guide 47 in laser 42 concentrates the pump power from source 41 to a relatively small cross-sectional area throughout the sample length and thus can provide significant improvements in the gain, and hence the threshold and efficiency of the laser. Moreover, a guided source such as laser 42 could be readily adapted for use in an optical communication system employing an integrated optics configuration. A description of the type of system and various circuit elements with which laser 42 might be useful is contained in an article entitled "Integrated Optics: An Introduction" by S. E. Miller, appearing in the *Bell System Technical Journal*, Volume 48, pages 2,059–2,069 in Sept. 1969.

Figure 5:
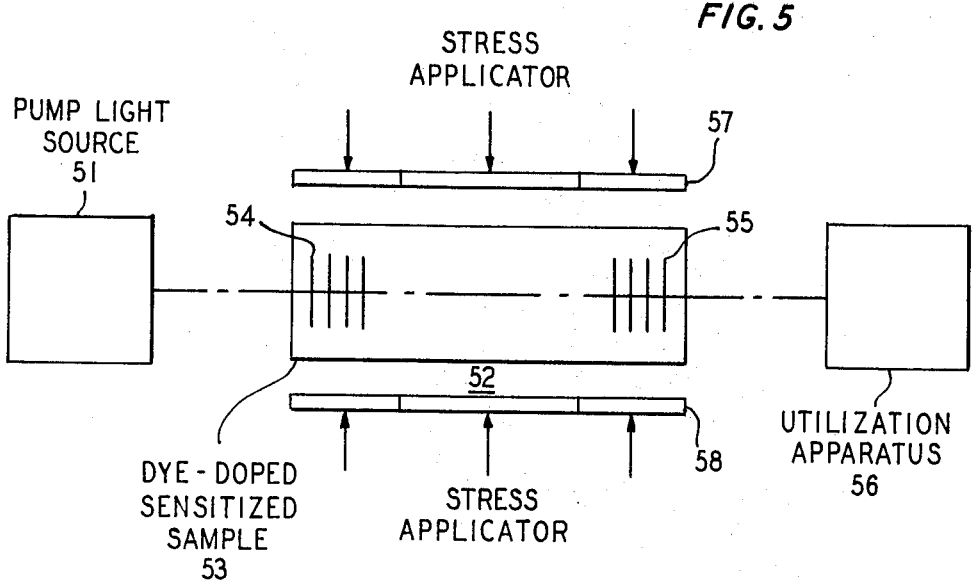
FIG. 5 is a diagrammatic illustration of apparatus according to our invention including means for applying stress to a laser sample to tune the selected resonated wavelength $\lambda_0$.

Tunability of a laser according to our invention is achieved in the apparatus illustrated in FIG. 5 of the drawings. Laser 52 illustratively includes stress applicators 57 and 58 which apply transverse stress to sample 53 to change the grating spacing $d$ of reflectors 54 and 55, or to change the resonator length $L$ between the reflectors, or to change both. Unlike the temperature variation of the output wavelength $\lambda_0$ for the laser, stress can produce a strain in the sample without a closely compensating index or refraction change.

The stress may be applied uniformly in one transverse direction as shown in the drawing or may be applied in both transverse directions. Alternatively, longitudinal stress or radial stress in cylindrical samples may be applied. In any case, a poly(methyl methacrylate) sample is substantially elastic under strain so that tuning is reversible in a particular range of wavelengths. In the preliminary experiment described above, the output wavelength $\lambda_0$ for the grating reflectors was shifted reversibly by 11 A using transverse stress. A tuning range of approximately 100 A in a suitably sized dye-doped poly(methyl methacrylate) laser would be feasible employing this means.

It should also be noted that the transverse stress may be applied independently to the regions of reflectors 54 and 55, or independently to the region between reflectors 54 and 55, or simultaneously to both regions. The former method would change only the grating spacing $d$ and therefore tune the resonated wavelength $\lambda_0$ according to equation (2) above. Application of stress to the region between the reflectors would shift the relative modes of the laser resonator, determined by the spacing $L$, with respect to the grating reflectivity band. In general, both degrees of freedom in tuning are useful for a laser according to our invention in order to center the output directly under the grating reflectivity peak as shown in FIG. 3.

We claim:

1. A device for producing the stimulated emission of radiation comprising a sample of optically transparent material sensitized for photo-induced molecular structural change tending to increase the index of refraction thereof and doped with an active medium, and means for launching pumping radiation in said sample to excite said active medium, said sample including a pair of index grating reflectors suitable for resonating radiation at a selected wavelength therebetween to facilitate the stimulated emission of coherent radiation at said selected wavelength.

2. A device according to claim 1 in which said sample further includes an increased index optical guide disposed in and along the length of said sample and coupled to said pair of reflectors.

3. A device according to claim 2 including means for applying stress to said sample to tune said grating reflectors for the selected wavelength of coherent stimulated radiation.

4. A device for producing the stimulated emission of radiation comprising a sample of optically transparent material sensitized for photo-induced molecular structural change tending to increase the index of refraction thereof and doped with an active medium providing gain in a particular wavelength range, said sample including a pair of grating reflectors aligned and separated by a distance L within the sample, said reflectors comprising a series of planes of alternating high and low refractive index with spacing $d$ between equivalent planes suitable for reflecting radiation at a selected wavelength in said wavelength range bidirectionally in the region between said reflectors, and means for launching pumping radiation in said sample to excite said active medium, whereby said reflectors provide feedback for the coherent emission of radiation at said selected wavelength.

5. A device according to claim 4 in which the grating spacing $d$ is given by
$$d = \lambda_0/2n$$
where $\lambda_0$ is the selected wavelength of coherent stimulated radiation and $n$ is the bulk index of refraction of said material.

6. A device according to claim 4 in which the material of said sample is poly(methyl methacrylate) including peroxides to provide sensitivity to said sample and including an active dye medium.

7. A device according to claim 4 in which said sample further includes an optical guide suitable for guiding said pumping radiation and said selected wavelength radiation within said sample, said guide comprising an elongated region of increased refractive index disposed along the length of said sample and coupled to said pair of reflectors.

8. A device according to claim 5 including means for applying stress transversely to said sample in the regions of said grating reflectors to change the spacing $d$ between equivalent refractive index planes, whereby the selected wavelength of coherent stimulated radiation $\lambda_0$ is tuned.

9. A device according to claim 8 in which said stressing means applies transverse stress to said sample in the region between said grating reflectors to change the distance L between said pair of reflectors.

10. A device according to claim 4 in which said pumping means comprises a laser and means for directing said pumping radiation axially in and along the length of said sample.

11. A device according to claim 4 in which said pumping means is a flash lamp and said pumping radiation is launched transversely to said sample in the region between said pair of reflectors.

12. A device for producing the stimulated emission of radiation comprising a sample of poly(methyl methacrylate) sensitized for molecular structural change tending to increase the index of refraction thereof upon exposure to ultraviolet radiation and doped with an active dye medium, said sample including a pair of grating reflectors comprising a series of planes of alternating high and low refractive index with spacing $d$ between equivalent planes suitable for reflecting radiation of a selected wavelength bidirectionally therebetween, an optical guide comprising an elongated region of increased refractive index disposed along the length of said sample and coupled to said pair of reflectors, and means for launching pumping radiation in said sample to excite said active dye medium.

* * * * *